Oct. 21, 1958   A. LANG ET AL   2,857,559
IMMERSION ELECTRICAL MEASURING INSTRUMENTS
Filed May 20, 1955   2 Sheets-Sheet 1

Oct. 21, 1958 A. LANG ET AL 2,857,559
IMMERSION ELECTRICAL MEASURING INSTRUMENTS
Filed May 20, 1955 2 Sheets-Sheet 2

United States Patent Office 2,857,559
Patented Oct. 21, 1958

2,857,559

IMMERSION ELECTRICAL MEASURING INSTRUMENTS

Alfred Lang, Esslingen, and Max Schwoerer, Wendenerhutte Uber Olpe, Westphalia, Germany, assignors to Elektro Mechanik G. m. b. H., Westphalia, Germany Application May 20, 1955, Serial No. 509,923

Section 1, Public Law 690, October 8, 1948
Patent expires October 8, 1968

8 Claims. (Cl. 317—155.5)

This invention relates to immersion electrical measuring instruments, i. e. electrical measuring instruments or control apparatus in which the current flows through a coil which moves axially in an annular air gap across which a magnetic field is established by a permanent magnet or an electromagnet.

Apparatus of this type is well known and the coil may be on a light weight frame or may be self-supporting to reduce the mass of the moving system to a minimum, thereby to obtain a favorable ratio of the moving system to the tractive forces. It has been the custom to apply a restoring force to the moving system by various arrangements of mechanical springs but the moving coil has a stroke of only a few millimeters and the prior arrangements have been open to the disadvantages that the range of adjustment to alter the measuring sensitivity was quite limited and it was difficult to alter the force of the springs.

Objects of the present invention are to provide immersion electrical measuring instruments which eliminate the disadvantages of the mechanical restoring springs of the prior art. More specifically, objects are to provide immersion measuring instruments having moving systems which include auxiliary coils for energization by direct current to develop restoring forces which impart desired and readily adjustable sensitivity characteristics to the instruments.

These and other objects and the advantages of the invention will be apparent from the following specification when taken with the accompanying drawings in which.

Figure 1:
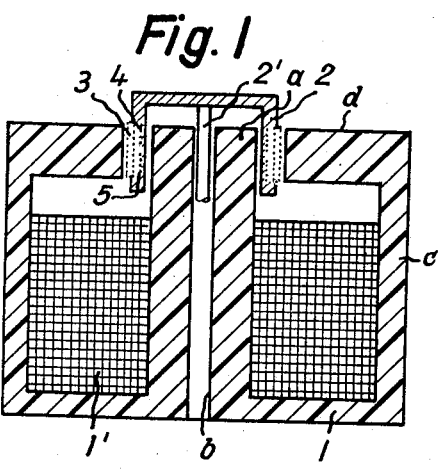
Fig. 1 is a central section through an electrical instrument embodying the invention.
Figure 2:
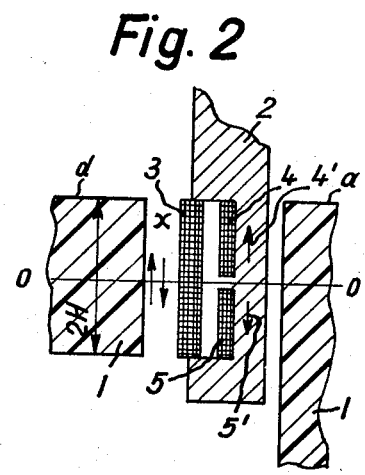
Fig. 2 is a fragmentary and greatly enlarged sectional view through one side of the moving system and adjacent magnetic field structure.

In Fig. 1, the reference numeral 1 identifies generally the iron field structure of an electromagnet having a winding 1' energized by direct current. The iron structure is of known form to constitute an annular chamber for the winding 1', and includes a cylindrical central core $a$ having a bore $b$ therethrough, an outer shell or wall $c$, and an annular end wall $d$ which is spaced radially from the core $a$ by an air gap in which a moving system comprising an inverted cup-shaped form 2 carrying a cylindrical control winding or coil 3 is axially movable in accordance with the magnitude and polarity of the control current $i_{st}$ through the coil. The moving system carries auxiliary coils 4, 5 of substantially identical construction which are to be energized in parallel by direct current, as will be explained later, to develop opposing forces to restore the moving system to a preselected zero position axially of the air gap when no current is passing through the control coil. The preselected zero position is usually that which locates the median transverse plane of the control coil 3 symmetrically with respect to the height 2H of the end wall $d$ of the magnetic field structure 1. As indicated by the arrows $x$ in Fig. 2, the moving system may be moved axially from its illustrated zero position in opposite directions according to the polarity and magnitude of the control current $i_{st}$.

In place of an electromagnet, it is of course possible to employ a permanent magnet field structure of the illustrated form.

Figure 3:
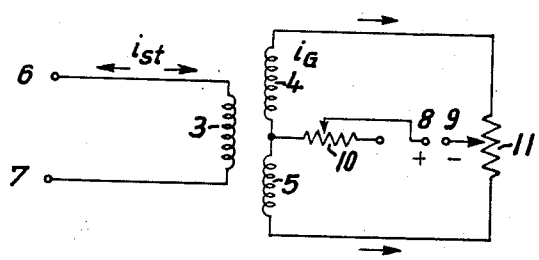
Fig. 3 is a circuit diagram of the electrical connections to the coils of the moving system.

As shown in Fig. 3, control coil 3 is provided with terminals 6 and 7 for connection to the source which develops or affects the electrical quantity which is to be measured or regulated. The moving system of the apparatus includes a rod 2' which extends through the bore $b$ of core $a$ and is connected to the pointer of an indicating device when the control quantity is to be measured or to appropriate switches when the apparatus developing the control quantity is to be regulated. A direct current source, not shown, is connected between terminals 8 and 9 for supplying current for energization of the coils 4 and 5, there being an adjustable resistance 10 connected between the junction of coils 4, 5 and the source terminal 8, and the other ends of the coils being returned to the opposite ends of a potentiometer 11 having a tap connected to source terminal 9. The direct current energization of coils 4 and 5 develops oppositely directed forces, indicated schematically by the arrows 4', 5' respectively, whose relative values may be so adjusted, by varying the position of the tap of potentiometer 11, that the moving system is returned to its desired zero position when the current through control coil 3 is zero. At this zero position of the moving system, the forces developed by coils 4 and 5 exactly balance each other and, on displacement of the moving system to either side of its illustrated zero position, the restoring force increases linearly as more and more turns of one auxiliary coil move outside of the magnetic field across the air gap. If the control coil current displaces the moving system upwardly, for example, the downward restoring force of coil 5 remains constant while the upward force of coil 4 decreases progressively as the coil 4 moves upwardly out of the flux established between the core $a$ and end plate $d$ of the magnetic field system 1.

Figure 4:
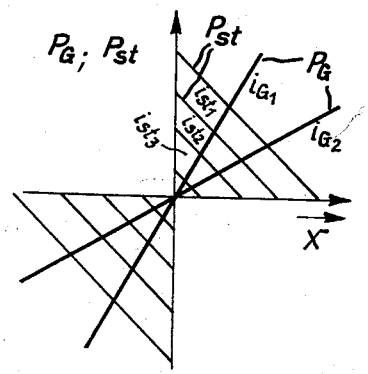
Figs. 4 and 5 are curve sheets showing characteristics of the instrument for different values of currents through the control and the auxiliary coils.
Figure 5:
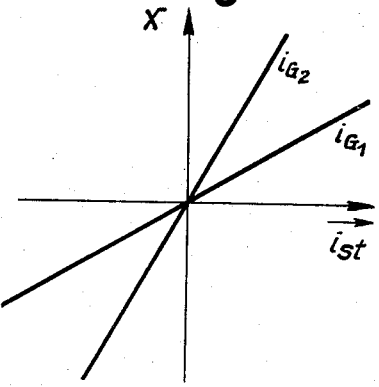

The auxiliary windings operate as an electrical spring whose strength may be adjusted by varying the resistance 10 and whose zero position may be altered without mechanical operations merely by shifting the tap of the potentiometer 11. The characteristics of the instrument are shown by the curves $P_{st}$ and $P_G$ of Fig. 4, the family of curves $P_{st}$ indicating the magnitude of the control forces developed by different values of control current $i_{st1}$, $i_{st2}$, etc. through coil 3, and curves $P_G$ showing the variation with displacement $x$ of the restoring forces corresponding to different current $i_{G1}$ and $i_{G2}$ through the auxiliary coils 4 and 5. The deflection $x$ of the moving system for a particular current $i_{st}$ in control coil 3 and restoring current $i_G$ in auxiliary coils 4 and 5 may be read from the intersection of the curves $P_{st}$ and $P_G$ for the selected values.

Figure 6:
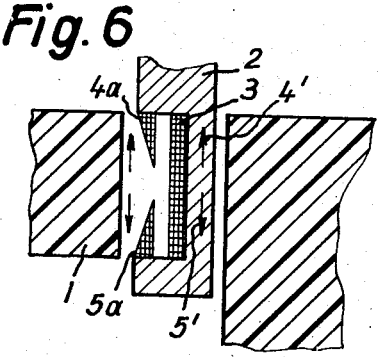
Fig. 6 is a fragmentary central section through one side of the field structure and a moving system constituting another form of the invention.
Figure 7:
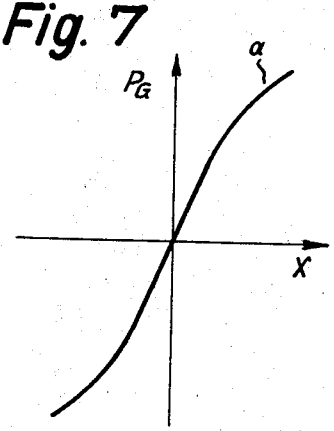
Figs. 7 and 8 are charts showing characteristics of instruments with moving systems of Fig. 6 type.
Figure 8:
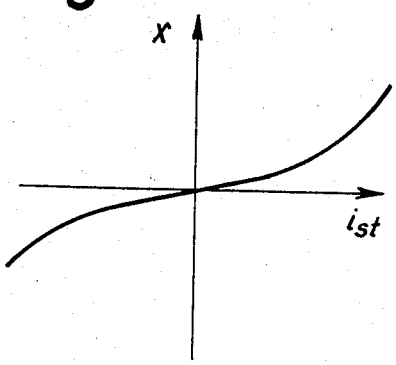

For many purposes, it is desirable to impart to the instrument a restoring force which does not vary as a linear function of the dispdacement $x$ of the moving system. As shown in Fig. 6, the moving system includes a control coil 3 as previously described but the auxiliary coils $4a$, $5a$ are not multi-layer solenoidal windings having the same density or number of turns at each cross-section from end to end. The auxiliary coils are tapered linearly from a few turns at their adjacent ends to a maximum number of turns at their outer ends. The restoring force $P_G$ developed by the windings 4 and 5 therefore falls off rapidly with the initial displacement $x$ of the moving system, and then more slowly, as shown by curve $a$ of Fig. 7, thereby increasing the sensitivity of the instrument for the higher control current values, as shown by curve X of Fig. 8. This type of auxiliary windings which decrease in density towards the median plane of the control coil is particularly useful in the measurement of electrical values which are of interest only above a certain range of low values and in the stable regulation of apparatus developing high values of control current.

Figure 9:
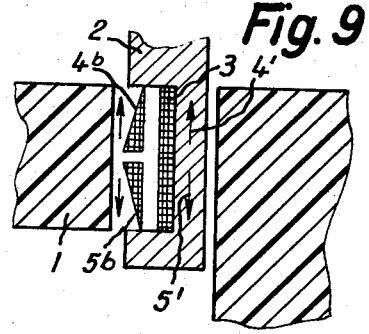
Fig. 9 is a fragmentary central section through one side of the field structure and moving system according to another form of the invention.
Figure 10:
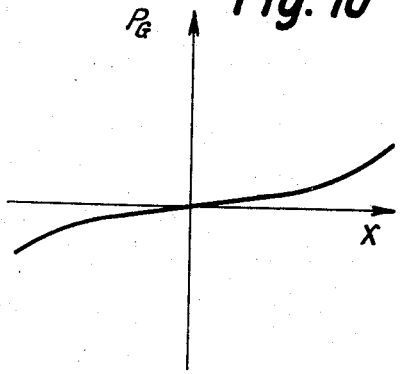
Figs. 10 and 11 are curve sheets showing characteristics of the Fig. 9 type of instrument.
Figure 11:
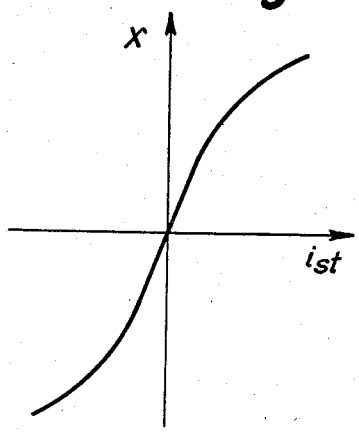

On the other hand, the auxiliary coils $4b$, $5b$ may be tapered linearly from a few turns at their outer ends to a plurality of turns at their inner ends, as shown in Fig. 9, to develop a restoring force $P_G$ which varies progressively from a small rate with initial deflections $x$ to a high rate at substantial deflections, as shown by curve $b$ of Fig. 10, thereby imparting to the instrument a measuring sensitivity which decreases progressively with increasing control current, as shown by curve X of Fig. 11.

The auxiliary coils for developing restoring forces which vary non-linearly with the control coil displacement $x$ need not vary linearly in density from end to end. The turn density may be varied in other manners to impart any desired non-uniform sensitivity to the measuring instrument.

We claim:

1. An immersion type electrical instrument comprising a magnetic field system including a cylindrical core radially spaced from an end wall by an annular air gap across which a magnetic field is established, a cylindrical moving system including a control coil movable axially in said annular air gap, and restoring means developing a force to locate said moving system with the median transverse plane of said control coil in a preselected zero position in said annular air gap on zero current through said control coil; said restoring means comprising a pair of substantially identical auxiliary coils on said moving system, and circuit means to energize said auxiliary coils in parallel by direct currents to exert axial and oppositely directed forces upon said moving system.

2. An immersion type electrical instrument as recited in claim 1, wherein said auxiliary coils are symmetrically positioned at opposite sides of the median transverse plane of the control coil.

3. An immersion type electrical instrument as recited in claim 2, wherein the winding density of said auxiliary coils is constant from end to end thereof.

4. An immersion type electrical instrument as recited in claim 2, wherein the winding density of said auxiliary coils decreases from their outer ends towards their adjacent ends, thereby to reduce the sensitivity of the instrument at low currents through said control coil.

5. An immersion type electrical instrument as recited in claim 2, wherein the winding density of said auxiliary coils increases from their outer ends towards their adjacent ends, thereby to increase the sensitivity of the instrument at low currents through said control coil.

6. An immersion type electrical instrument as recited in claim 1, wherein said circuit means includes an adjustable resistance for simultaneously varying the values of the direct currents through said auxiliary coils.

7. An immersion type electrical instrument as recited in claim 1, wherein said restoring means includes adjustable zero-setting means for varying the preselected zero position of said moving system.

8. An immersion type electrical instrument as recited in claim 7, wherein said zero-setting means comprises a potentiometer in said circuit means for adjusting the ratio of the direct currents through the respective auxiliary coils.

References Cited in the file of this patent

UNITED STATES PATENTS

| | | |
|---|---|---|
| 2,128,722 | Wickersham | Aug. 30, 1938 |
| 2,263,819 | Ray | Nov. 25, 1941 |
| 2,354,618 | Sias | July 25, 1944 |